(12) United States Patent
Pighi et al.

(10) Patent No.: US 10,857,957 B1
(45) Date of Patent: Dec. 8, 2020

(54) AUXILIARY POWER SUPPLY SYSTEM FOR HIGH POWER LOADS

(71) Applicant: Ambarella International LP, Santa Clara, CA (US)

(72) Inventors: Omar Pighi, Parma (IT); Paolo Grisleri, Roveleto di Cadeo (IT); Alessandro Giacomazzo, Parma (IT)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 16/996,124

(22) Filed: Aug. 18, 2020

Related U.S. Application Data

(63) Continuation of application No. 16/369,333, filed on Mar. 29, 2019, now Pat. No. 10,780,852.

(30) Foreign Application Priority Data

Jun. 28, 2018 (IT) .................... 102018000006784

(51) Int. Cl.
| | |
|---|---|
| *B60R 16/033* | (2006.01) |
| *B60L 53/34* | (2019.01) |
| *H02J 9/06* | (2006.01) |
| *H02J 7/00* | (2006.01) |
| *B60R 16/03* | (2006.01) |

(52) U.S. Cl.
CPC ............ *B60R 16/033* (2013.01); *B60L 53/34* (2019.02); *B60R 16/03* (2013.01); *H02J 7/0013* (2013.01); *H02J 7/0045* (2013.01); *H02J 9/061* (2013.01)

(58) Field of Classification Search
CPC ....... B60R 16/033; B60R 16/03; B60L 53/34; H02J 7/0013; H02J 7/0045
USPC ....... 307/9.1, 10.1, 10.7; 320/103, 104, 107, 320/111, 137, 138
See application file for complete search history.

(56) References Cited

U.S. PATENT DOCUMENTS

2009/0206660 A1\* 8/2009 Makita .................. H02J 7/1423
307/9.1

\* cited by examiner

*Primary Examiner* — Tomi Skibinski
(74) *Attorney, Agent, or Firm* — Christopher P. Maiorana, PC

(57) ABSTRACT

An apparatus includes a first interface, a first converter, a high-voltage battery, a second converter and a second interface. The first interface may be configured to receive a first low-voltage signal from first power rail of a vehicle. The first converter may be configured to generate a high-voltage signal by up-converting the first low-voltage signal. The high-voltage battery may be configured to store the high-voltage signal. The second converter may be configured to generate a second low-voltage signal by down-converting the high-voltage signal. The second interface may be configured to present the second low-voltage signal to a second power rail of the vehicle. The first power rail may be electrically separated from the second power rail.

20 Claims, 3 Drawing Sheets

AUXILIARY POWER SUPPLY SYSTEM FOR HIGH POWER LOADS

This application relates to U.S. application Ser. No. 16/369,333, filed Mar. 29, 2019, which relates to Italian Application No. 102018000006784, filed Jun. 28, 2018. Each of the above applications are hereby incorporated by reference in its entirety.

FIELD OF THE INVENTION

The invention relates to vehicle power systems generally and, more particularly, to a method and/or apparatus for implementing an auxiliary power supply system for high power loads in a vehicle.

BACKGROUND

Improvements in electronics for modern automobiles result in high current demands. While an internal combustion engine of the automobile is running, a generator can create a limited amount of current. The amount of current is determined by the manufacturer to meet a maximum current that the automobile systems can consume. A small "extra" current capacity is commonly left in reserve. After-market high-power loads added to the automobile typically exceed the reserve current capacity of the generator. Furthermore, when the internal combustion engine is switched off, conventional batteries typically cannot meet the steady-state current demands of the high-power loads. If the batteries can satisfy the loads, the batteries are usually drained in a short time.

It would be desirable to implement an auxiliary power supply system for high power loads in a vehicle.

SUMMARY

The invention concerns an apparatus including a first interface, a first converter, a high-voltage battery, a second converter and a second interface. The first interface may be configured to receive a first low-voltage signal from first power rail of a vehicle. The first converter may be configured to generate a high-voltage signal by up-converting the first low-voltage signal. The high-voltage battery may be configured to store the high-voltage signal. The second converter may be configured to generate a second low-voltage signal by down-converting the high-voltage signal. The second interface may be configured to present the second low-voltage signal to a second power rail of the vehicle. The first power rail may be electrically separated from the second power rail.

BRIEF DESCRIPTION OF THE FIGURES

Embodiments of the invention will be apparent from the following detailed description and the appended claims and drawings in which:

DETAILED DESCRIPTION OF THE EMBODIMENTS

Figure 1:
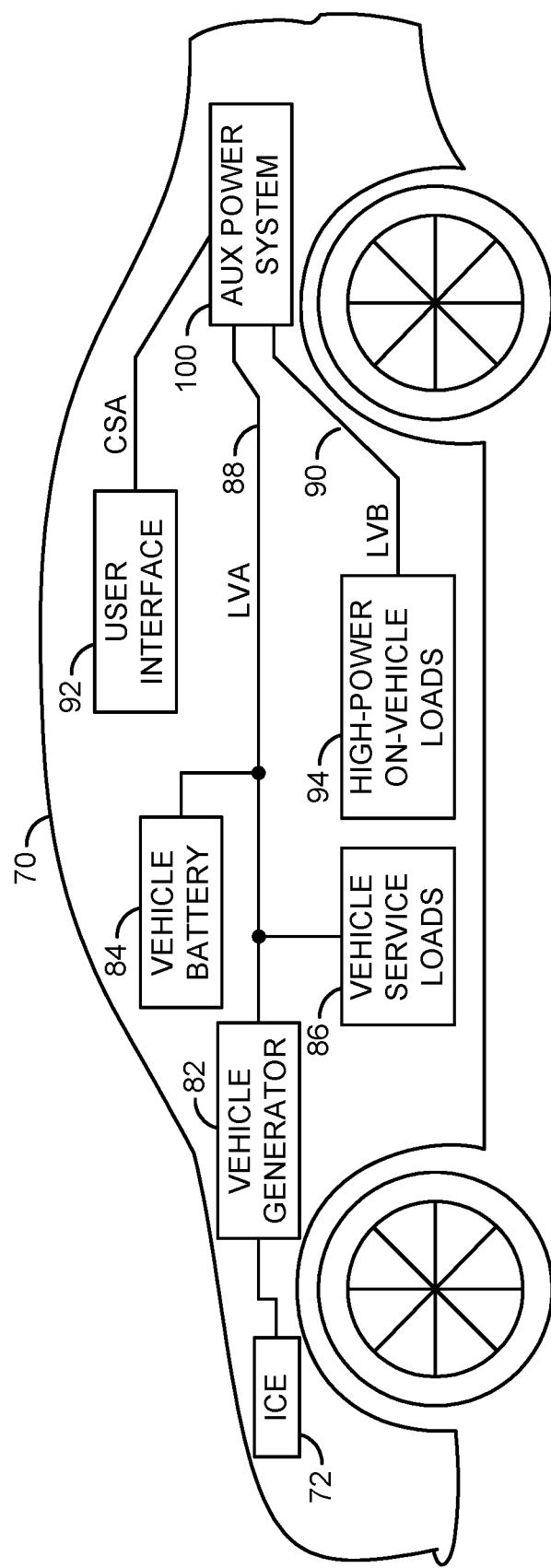
FIG. 1 is a diagram of a vehicle in accordance with an embodiment of the invention.

Embodiments of the present invention include providing an auxiliary power supply system for high power loads in a vehicle that may (i) provide an after-market technique to accommodate high-power electrical loads, (ii) provide current beyond a main power distribution system capacity, (iii) power electrical loads for a long time while an engine is switched off, (iv) operate from electrical power received from a wall source (v) operate from electrical power received from an auxiliary source and/or (vi) provide uninterrupted electrical power while hot-swapping between power sources.

Embodiments of the invention generally provided an auxiliary power system and auxiliary power distribution technique that are capable of powering a secondary power bus independent from a main electrical bus of an internal combustion engine type vehicle (e.g., automobile, truck, bus, etc.). A generator (or alternator) of the vehicle may generate electrical power derived from the internal combustion engine. Use of electrical power from the generator may be considered a "vehicle powered mode." The generated electrical power may be shared by the auxiliary power system and a main (or normal) power system. The secondary power bus and the main power bus may be electrically independent of each other, except for the common connection to the generator. The secondary power bus may be operational while the internal combustion engine of the vehicle is switched off and thus the main power bus is dependent on a vehicle (or normal) battery.

Various embodiments of the invention may utilize the auxiliary power system to provide electrical power to high power loads connected to the secondary power bus. In some cases, the high power loads may be loads that draw on average more electrical current than the main power bus can distribute. In various situations, the high power loads may be loads the draw surge currents greater than a capacity of the vehicle generator and the vehicle battery without impacting the rest of the vehicle electronics. In some embodiments, the auxiliary power system may provide up to 15 kilowatts (kW) of power to the secondary power bus for extended periods. For example, the auxiliary power system may provide 1.5 kW of power to loads on the secondary power bus from a 10 kW hour (kWh) capacity battery for up to 6.4 hours, 5 kW of power from a 30 kWh capacity for 6 hours, and 15 kW of power from a 100 kWh capacity for up to 6.4 hours after the vehicle engine is switched off and an internal high-voltage battery is fully charged.

In various embodiments, the auxiliary power system may receive electrical power from an AC powered battery charger connection and/or another source (e.g., an auxiliary power unit) inside and/or outside the vehicle. Distribution of electrical power from the battery charger may be referred to as a "wall powered mode." Distribution of electrical power from the auxiliary power unit may be referred to as an "auxiliary power mode." The battery charger may drive the high power loads for an unlimited amount of time during indoor employment or outdoor employment (e.g., software testing, etc.) with the vehicle engine off. The unlimited engine-off operation of the high power loads may allow sufficient time to perform diagnostics, uploading and/or downloading of information to and from the electronics. For example, data gathered and stored during autonomous-driving trips may be downloaded from autonomous driving computers powered through the secondary power bus while the vehicle is inside a garage. Electrical power from the battery charger and/or auxiliary power unit may also be used to charge one or more batteries internal to the auxiliary power system.

The auxiliary power system may provide electrical power to the secondary power bus in the absence of power from the vehicle generator, the battery charger and the auxiliary power unit. The auxiliary power system may also enable hot swapping among the various sources of electrical power. A backup battery internal to the auxiliary power system generally allows smooth switching among the vehicle power mode, the wall power mode and the auxiliary power mode without interrupting or compromising operations of the loads that rely on power from the secondary power bus.

Referring to FIG. 1, a diagram of an example implementation of a vehicle 70 is shown in accordance with an embodiment of the invention. The vehicle 70 may be an automobile, a truck, a bus, or any other passenger and/or cargo carrying vehicle powered by an internal combustion engine. The vehicle 70 may include an engine compartment (or area), a passenger compartment (or area) and a trunk compartment (or area) The vehicle 70 generally comprises an engine 72, a device (or circuit) 82, a device (or circuit) 84, a device (or circuit) 86, a device (or circuit) 88, a device (or circuit) 90, a device (or circuit) 92, a device (or circuit) 94 and a device (or circuit) 100.

A signal (e.g., CSA) may be transferred between the device 92 and the device 100. The signal CSA may carry command data and status data between the devices 92 and 100. A signal (e.g., LVA) may be generated by the device 82 and transferred by the device 88 to the devices 84, 86 and 100. The signal LVA may implement a low-voltage power signal. A signal (e.g., LVB) may be generated by the device 100 and transferred to the device 94 via the device 90. The signal LVB may implement another low-voltage power signal.

The engine 72 may implement an internal combustion engine. The engine 72 is generally operational to provide mechanical power to a transmission of the vehicle 70 and the device 82.

The device 82 may implement a vehicle generator. The vehicle generator (or alternator) 82 is generally operational covert mechanical power from an engine of the vehicle 70 into low-voltage electrical power as the signal LVA. In various embodiments, the low-voltage generated by the vehicle generator 82 may range from approximately 10 volts DC to approximately 50 volts DC (VDC) (e.g., 12 VDC, 24 VDC and/or 48 VDC electrical systems). The vehicle generator 82 is generally located in the engine compartment.

The device 84 may implement a battery. In various embodiments, the battery 84 may be a normal automotive (or vehicle) battery. The vehicle battery 84 may be charged by the vehicle generator 82 via the signal LVA. The vehicle battery 84 may provide electrical power in the signal LVA to other electronics in the vehicle 70 while being discharged. The low-voltage generated by the vehicle battery 84 may range from approximately 8 volts DC to approximately 50 volts DC. The vehicle battery 84 is generally located in the engine compartment.

The device 86 may implement vehicle service load devices (or circuits). The service load devices (or service loads for short) 86 may receive electrical power from the vehicle generator 82 and/or the vehicle battery 84 in the signal LVA. The vehicle service loads 86 may include, but are not limited to, exterior lighting, interior lighting, electronic control units, door locks, window motors, wiper blades, fans, radio, air conditioning, seat heaters, seat adjustments and the like. The vehicle service loads may be located throughout the vehicle 70, in the engine compartment, the passenger compartment, the trunk and/or other locations.

The device 88 may implement a main low-voltage bus (or power rail). The main low-voltage bus 88 may be operational to distribute the signal LVA among the vehicle generator 82, the vehicle battery 84, the vehicle service loads 86 and the device 100. In various embodiments, the main low-voltage bus 88 may utilize the vehicle chassis as a ground bus.

The device 90 may implement an auxiliary low-voltage bus (or power rail). The auxiliary low-voltage bus 90 may be operational to distribute the signal LVB from the device 100 to the device 94. The auxiliary low-voltage bus 90 may be electrically isolated from the main low-voltage bus 88. The isolation may include separate hot wires and separate ground wires from the main low-voltage bus 88. In various embodiments, the low voltage generated by the device 100 in the signal LVB may range from approximately 10 volts DC to approximately 50 volts DC.

The device 92 may implement a user interface device (or circuit). The user interface device 92 may be operational for bidirectional communication with the device 100 via the signal CSA. The communications may be based on an Ethernet protocol, a Controller Area Network protocol, a Universal Serial Bus protocol or similar standard techniques. Information conveyed by the signal CSA may include, but is not limited to systems status, current energy source status, flowing current, voltages and estimated remaining time using the battery at the current rate. The user interface device 92 may allow a user to switch between different energy sources and/or different system status indicators. The user interface device 92 is generally located in the passenger compartment.

The device 94 may implement one or more high-power on-vehicle load devices (or circuits). The high-power load device (or high-power loads for short) 94 may receive electrical power from the device 100 in the signal LVB. The high-power loads 94 may include, but are not limited to, cooling system, autonomous driving computers, advanced driving assistance systems, multimedia systems, actuators and cleaning systems for sensors. The high-power loads may be located in multiple locations about the vehicle 70 including, but not limited to, a roof space, a trunk, external parts of the shell (or body), a passenger cabin and the like.

The device 100 may implement an auxiliary power system. The auxiliary power system (or circuit) 100 may be operational to provide low-voltage electrical power in the signal LVB to the high-power loads 94. The auxiliary power system 100 may also be operational to store electrical energy in one or more internal batteries to provide a high storage capacity in a small physical area and/or to provide for uninterrupted power to the high-power loads during mode switches. The auxiliary power system 100 is generally located in the trunk and may be accessible to a user while the trunk door is open. Some parts, such as DC/DC converters, may utilize liquid cooling and so may be installed in the engine bay and linked to the engine or other cooling system.

Figure 2:
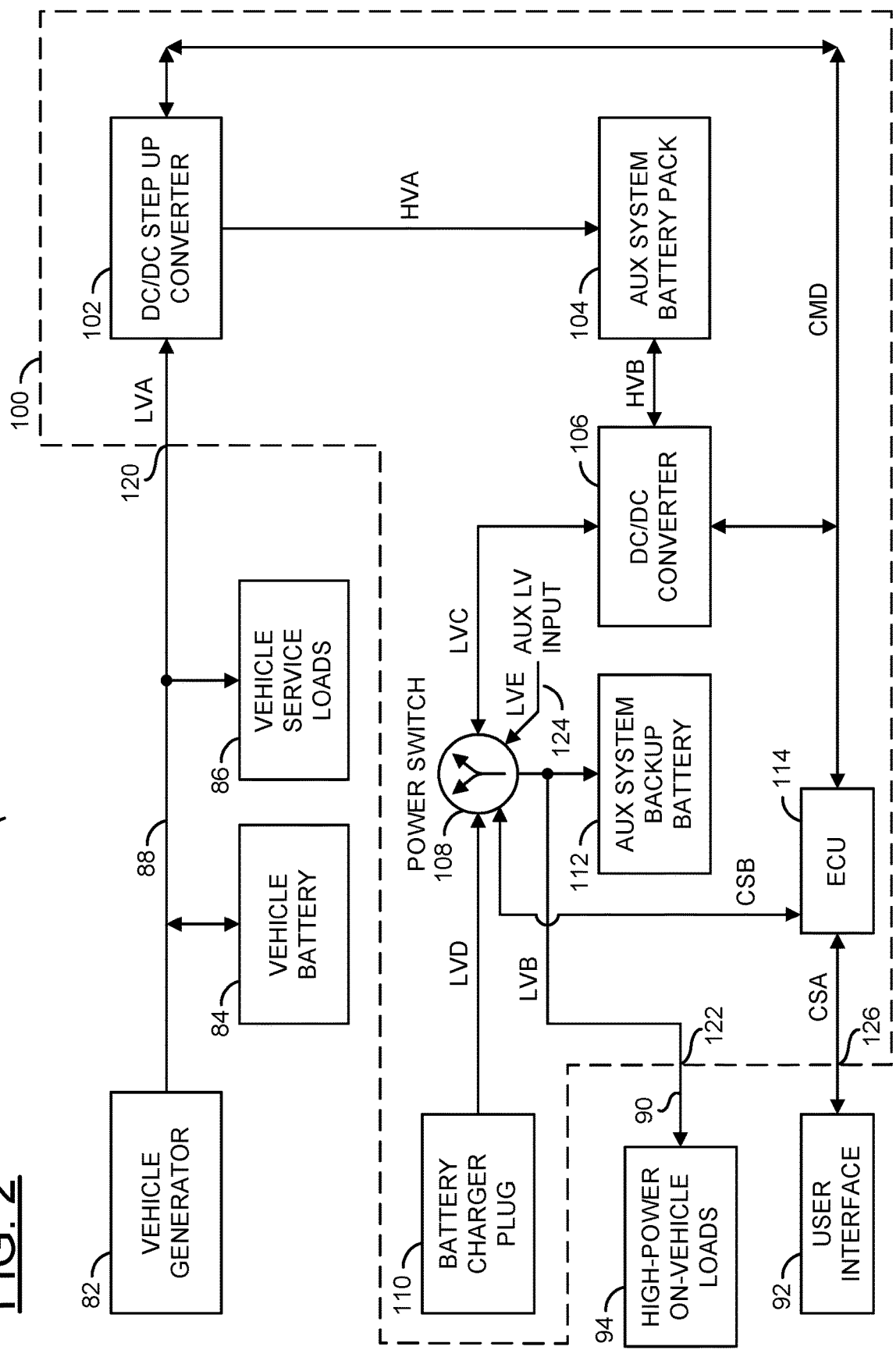
FIG. 2 is a diagram of an electrical system of the vehicle accordance with an embodiment of the invention.

Referring to FIG. 2, a diagram of an example implementation of an electrical system 80 of the vehicle 70 is shown in accordance with an embodiment of the invention. The electrical system 80 generally comprises the vehicle generator 82, the vehicle battery 84, the vehicle service loads 86, the main low-voltage bus 88, the auxiliary low-voltage bus 90, the user interface device 92, the high-power loads 94 and the auxiliary power system 100.

The auxiliary power system 100 generally comprises a device (or circuit) 102, a device (or circuit) 104, a device (or circuit) 106, a device (or circuit) 110, a device (or circuit) 112 and a block (or circuit) 114. The main low-voltage bus 88 may connect to the auxiliary power system 100 at an interface (or port) 120. The auxiliary low-voltage bus 90 may connect to the auxiliary power system 100 at an interface (or port) 122. An interface (or port) 124 may connect the auxiliary power system 100 to another low-voltage power source. The auxiliary power system 100 may include an interface (or port) 126 connected to the user interface device 92.

The signal LVA may be received at the interface 120 of the auxiliary power system 100. The signal LVB may be presented from the device 108 to the device 112 and the interface 122 of the auxiliary power system 100. A signal (e.g., LVC) may be exchanged between the device 106 and the device 108. The signal LVC may be a low-voltage signal. A voltage carried by the signal LVC may be similar to the voltage in the signal LVB. A signal (e.g., LVD) may be transferred from the device 110 to the device 108. The signal LVD may be a low-voltage signal. A voltage carried by the signal LVD may be similar to the voltage in the signal LVB. A signal (e.g., LVE) may be received by the device 108 from a source external to the auxiliary power system 100. The signal LVE may be a low-voltage signal. A voltage carried by the signal LVE may be similar to the voltage in the signal LVB.

A signal (e.g., HVA) may be generated by the device 102 and received by the device 104. The signal HVA may implement a high-voltage signal. In various embodiments, the voltage of the signal HVA may range from approximately 200 volts direct current (VDC) to approximately 600 VDC. A signal (e.g., HVB) may be exchanged between the device 104 and the device 108. The signal HVB may implement a high-voltage signal. The signal HVB may have a similar voltage range as the signal HVA. In various embodiments, the signals HVA and HVB may be the same signal.

The signal CSA may be exchanged between the user interface device 92 and the device 114 through the interface 126. A signal (e.g., CSB) may be exchanged between the device 108 and the device 114. The signal CSB may convey commands and data between the devices 108 and 114. A signal (e.g., CMD) may be exchanged between the devices 102 and the device 114, and between the device 106 and the device 114. The signal CMD may carry commands and data among the devices 102, 106 and 114.

The device 102 may implement a DC/DC step-up converter (or up-converter). The up-converter 102 is generally operational to generate the high-voltage signal HVA by up-converting the low-voltage signal LVA. In various embodiments, the up-converter 102 may have a capacity to present up to 15,000 watts of power in the signal HVA. The up-converter 102 may receive control commands from the device 114 via the signal CMD. Status and data may be reported from the up-converter 102 to the device 114 in the signal CMD. The device 104 may implement a high-voltage battery. The high-voltage battery 104 may be designed as one or more batteries (or battery packs). The high-voltage battery 104 may be one or more common hybrid/electric batteries or one or more low-voltage batteries. Bigger vehicles may accommodate higher capacity batteries and/or more than one battery. In various embodiments, the high-voltage battery 104 may store up to 100 kWh of energy. The high-voltage battery 104 may be changed from the signal HVA and/or the signal HVB. The high-voltage battery 104 generally discharges through the signal HVB.

The device 106 may implement a DC/DC converter. In various embodiments, the converter 106 may implement a down-converter circuit. As a down-converter, the converter 106 may generate the low-voltage signal LVC by down-converting the high-voltage signal HVB. In some embodiments, converter 106 may implement a bidirectional converter. Control between down-converting and up-converting may be based on commands received in the signal CMD. As a down-converter, the bidirectional converter 106 may generate the low-voltage signal LVC by down-converting the high-voltage signal HVB. As an up-converter, the bidirectional converter 106 may generate the high-voltage signal HVB by up-converting the low-voltage signal LVC. In various embodiments, the converter 106 may down-convert up to 15,000 watts of power. The converter 106 may also up convert up to 15,000 watts of power.

The device 108 may implement a power switch (or switch for short). The switch 108 may be operational to control connecting and disconnecting the various low-voltage signals LVB, LVC, LVD and/or LVE using manual control and/or electrical control. Where manual control is implemented, the switch 108 may include a manual knob (or lever) accessible from an exterior of a housing of the auxiliary power system 100. The auxiliary power system 100 may be positioned in the trunk of the vehicle 70 such that the manual knob of the switch 108 is readily accessible to a user. Where electrical control is implemented, the switch 108 may communicate with the device 114 via the signal CSB.

In various embodiments, the switch 108 may be a double-pole N-throw switch. The value of N may range from 2 to 4, depending on the number of power sources available to the auxiliary power system 100. The switch 108 may be operational to route low-voltage power among the signals LVB, LVC, LVD and the LVE. In various embodiments, the switch 108 may be implemented as a break-before-make type of switch. In other embodiments, the switch 108 may be implemented as a make-before-break type of switch. In an example configuration, the switch 108 may connect and disconnect the signals LVB and LVC (e.g., 2P1T). In another example configuration, the switch 108 may route the signal LVB between the signals LVC and LVD (e.g., 2P2T). In still another configuration, the switch 108 may switch the signal LVB between the signals LVC, LVD and LVE (e.g., 2P3T). The switch 108 may also be configured to connect the signal LVD to the signal LVC to charge the high-voltage battery 104 through the device 110. The switch 108 may also be configured to connect the signal LVD to the signals LVB and LVC simultaneously to change both the high-voltage battery 104 and the device 112 through the device 110.

The device 110 may implement a battery charger plug (or wall plug). The battery charger plug 110 may be operational to generate the signal LVD from a power source external to the vehicle 70. In various embodiments, the power source may be a 120-volt alternating current (VAC) to direction current (VDC) power converter. Other power sources may be implemented to meet the design criteria of a particular application.

The device 112 may implement another low-voltage battery. The low-voltage battery 112 may be referred to as an auxiliary system backup battery. The auxiliary system backup battery 112 may be operational to store up to 100 ampere hours with a high in-rush current. The auxiliary system backup battery 112 generally allows a smooth switching between the vehicle mode and the wall power mode with the system on, without interrupting or compromising an ability to deliver power to the high-power loads 94. In various embodiments, the auxiliary system backup battery 112 may be located inside a housing of the auxiliary power system 100.

The device 114 may implement an electronic control unit (ECU). The electronic control unit 114 is generally operational to control the switch 108, the converter 106 and the up-converter 102 in response to commands received from the user interface device 92. In some designs, the electronic control unit 114 may be aware of a running/not running status of the internal combustion engine 72.

During normal engine-on operations, the up-converter 102 steps up the low-voltage power in the signal LVA generated by the vehicle generator 82 to create the signal HVA. Up-converting to the higher voltage may reduce a current value flowing in the signal HVA relative to the signal LVA. The high-voltage battery 104 may store the high-voltage power for the auxiliary system 100. The converter 106 may be connected to the high-voltage battery 104 via the signal HVB. The converter 106 may generate the low-voltage power in the signal LVC for use internal to the auxiliary power system 100 and by the high-power loads 94. The signal LVC may also be routed to the auxiliary system backup battery 112 through the switch 108.

Since the high-power loads 94 may draw power through the auxiliary power system 100, the total amount of power drawn may exceed the capacity of the vehicle generator 82 for a limited amount of time. The vehicle generator 82 may provide any excess power not consumed by the normal vehicle service loads 86 to the auxiliary power system 100 to charge the high-voltage battery 104 through the up-converter 102. With the vehicle generator 82 operating at or near fully capacity, the auxiliary power system 100 may route some of the low-voltage power received in the signal LVA to the signal LVB. Any excess power demand may be provided to the high-power loads 94 from the high-voltage battery 104 and the converter 106.

The signal LVD provided by the battery charger plug 110 may also be routed to the auxiliary system backup battery 112 through the switch 108. The signal LVD may be derived from an external DC power supply used for indoor testing, software updating, data downloads and/or battery charging. The signal LVE may also be provided to the switch 108 through the auxiliary connector 124. The auxiliary connector 124 may receive low-voltage power from another power source, such as a solar panel on a roof of the vehicle 70, or any other low-voltage power source available.

The converter 106 may be commanded to work in reverse mode and up-convert the low-voltage power in the signal LVC into the high-voltage power in the signal HVB. Operating the converter 106 as an up-converter may allow a recharge of the high-voltage battery 104 using power taken from the battery charger plug 110 or from the auxiliary connector 124. A user may send commands and/or check DC/DC converter status using control and status signals in the signal CMD. The user can also manually and/or remotely control the switch 108 and check status of the switch 108 via the signal CSB.

Installation of the auxiliary power system 100 in the vehicle 70 may resolve issues with limited power available from the vehicle generator 82. The vehicle generator 82 is generally designed for a maximum power demand and a small percentage of extra available power sized for safety. The auxiliary power system 100 may convert the unused capacity from the vehicle generator 82 and store the energy in the high-voltage battery 104 and/or the auxiliary system backup battery 112. The low-voltage power pulled from the vehicle generator 82 may be current limited to avoid damaging the vehicle generator 82. The electronic control unit 114 may know the maximum amount of current of the vehicle generator 82 and the instantaneous amount of current used by the vehicle service loads 86. The electronic control unit 114 may dynamically control the up-converter 102 to adjust the amount of output current provided in the signal HVA. By limiting the power presented in the signal HVA, the up-converter 102 may limit the input current drawn in the signal LVA.

The auxiliary power system 100 may up-convert the voltage and store the high-voltage power for efficiency reasons. Energy packed in higher-voltage batteries generally occupies less volume than using low-voltage batteries. A ratio of energy/volume may also be higher for the higher-voltage batteries. Therefore, high-voltage batteries may store more energy than low voltage batteries in the same volume. Moreover, working at high voltages generally means that the flowing current values are lower causing less ohmic loss in the wires.

The auxiliary power system 100 generally takes the stored high-voltage power from the high-voltage battery pack 104 as the high-power loads 94 demand. The high-voltage power may be restored to the low-voltage using the converter 106. The low-voltage power in the signal LVB on the auxiliary low-voltage bus 90 may physically and electrically separate from the main low-voltage bus 88. Keeping the two power systems separate from each other generally avoids malfunctions of the original equipment manufacturer systems caused by issues on the auxiliary loads. For example, a failure of one or more high-power loads 94 may corrupt the auxiliary low-voltage bus 90 but the vehicle 70 may still be started and moved using the main low-voltage bus 88.

Figure 3:
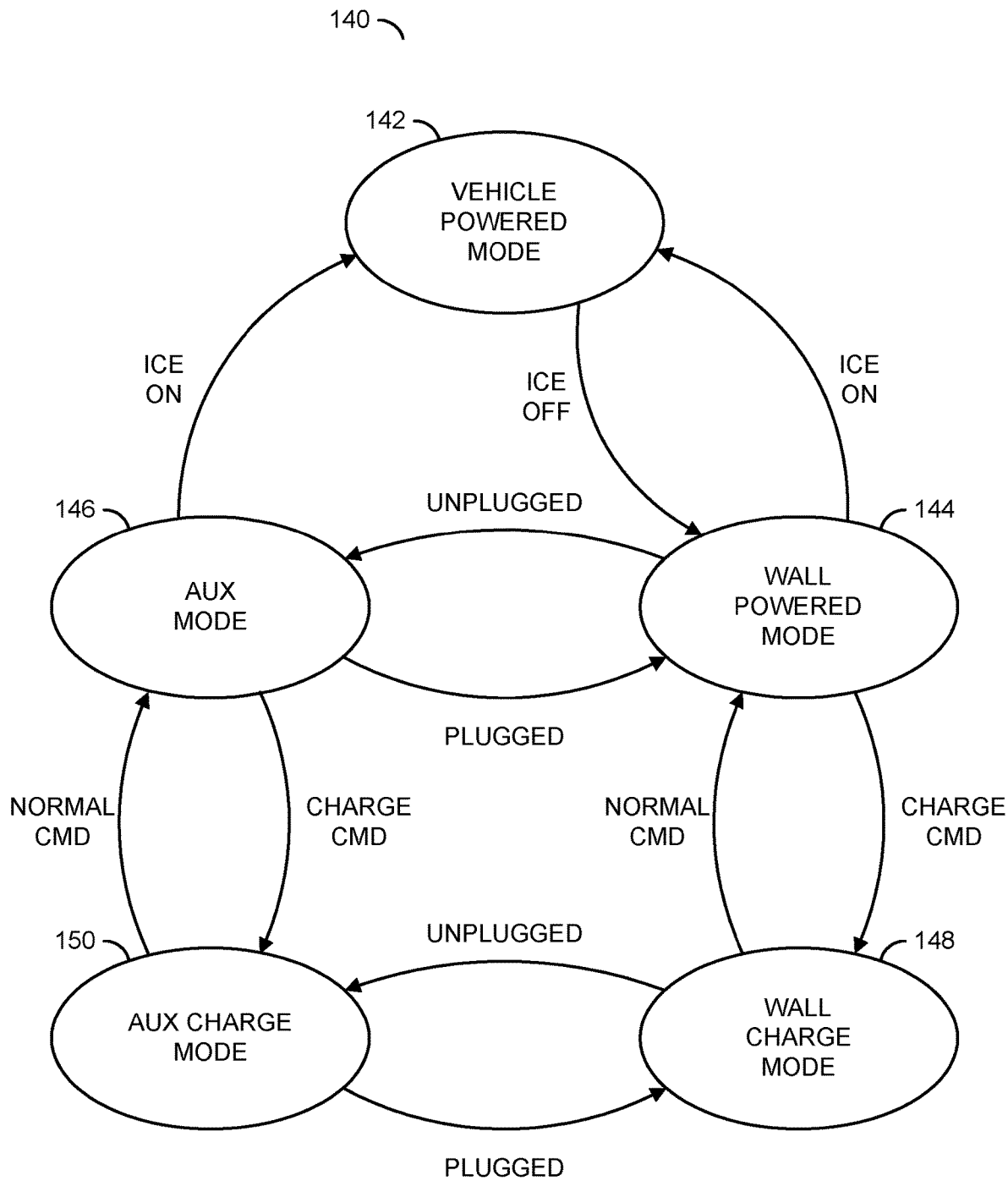
FIG. 3 is a state transition diagram of an electronic control unit of the electrical system in accordance with an embodiment of the invention.

Referring to FIG. 3, a state transition diagram 140 of an example implementation of the electronic control unit 114 is shown in accordance with an embodiment of the invention. The state transition diagram 140 generally provides multiple (e.g., five) states, including a state (or mode) 142, a state (or mode) 144, a state (or mode) 146, a state (or mode) 148 and a state (or mode) 150. The states 142 to 150 may be considered the states of the electronic control unit 114, the states of the electrical system 80 and/or the states of the vehicle 70.

The state 142 may implement a vehicle powered mode. While in the state 142, if the engine 72 of the vehicle 70 is generating mechanical power, the vehicle generator 82 may convert the mechanical power into the low-voltage signal LVA. The auxiliary power system 100 may up-convert the low-voltage power, store the high-voltage power in the high-voltage battery 104, and down-covert the high-voltage power back into low-voltage power in the signal LVC. The switch 108 may by commanded to route the signal LVC to the signal LVB to power the high-power loads 94 and charge the auxiliary system backup battery 112.

The state 144 may implement a wall powered mode. When the engine 72 is stopped (e.g., ICE OFF), the electronic control unit 114 may transition to the state 144. While in the state 144, electronic control unit 114 may command the switch 108 to connect the signal LVD to the signal LVB. If low-voltage power is available from the battery charger plug 110, the low-voltage power in the signal LVD may be routed through the switch 108 to the signal LVB and out to the high-power loads 94.

If insufficient electrical power is received from the battery charger plug 110, the electronic control unit 114 may command the converter 106 into the down-conversion mode. The high-voltage battery 104 may provide current to the converter 106. The converter 106 may generate the signal LVC that is subsequently routed through the switch 108 to the auxiliary low-voltage bus 90 as the signal LVB.

If the engine 72 is started while the electronic control unit 114 is in the state 144, the electronic control unit 114 may command the switch to change the connection for the signal LVB from the signal LVD back to the signal LVC, if not already connected. The electronic control unit 114 may subsequently transition (e.g., ICE ON) back to the state 142.

The state 146 may implement an auxiliary mode state. If the battery charger plug 110 is unplugged and the engine 72 is off while in the state 144, the electronic control unit 114 may transition (e.g., UNPLUGGED) to the state 146. While in the auxiliary mode state 146, the electronic control unit 114 may command the switch 108 to route low-voltage power from the signal LVE to the signal LVB. The switch 108 may route the power to the high-power loads 94 as the signal LVB.

If insufficient power is available from the auxiliary connector 124, and since the engine 72 is not running while in the state 146, the electronic control unit 114 may command the converter 106 into the down-conversion mode, and command the switch 108 to connect the signal LVC to the signal LVB. The high-voltage energy stored in the high-voltage battery 104 may be discharged into the converter 106. The converter 106 may generate low-voltage power in the signal LVC.

If the battery charger plug 110 receives power while in the state 146, the electronic control unit 114 may transition (e.g., PLUGGED) back to the state 144. Thereafter, the electronic control unit 114 may command the switch 108 to route power from the signal LVD to the signal LVB to drive the high-power loads 94.

If the engine 72 is started while in the state 146, the electronic control unit 114 may transition (e.g., ICE ON) back to the state 142. The electronic control unit 114 may command the converter 106 into the down-conversion mode and command the switch 108 to route the low-voltage power in the signal LVC to the signal LVB to drive the high-power loads 94.

The state 148 may implement a wall charger mode. Upon a transition (CHARGE CMD) to the state 148, the electronic control unit 114 may command the switch 108 to connect the signal LVD to the signal LVC in the state 148. The electronic control unit 114 may also command the converter 106 into the up-conversion mode. In the up-conversion mode, the converter 106 may charge the high-voltage battery 104 using the power in the signal LVC as received from the battery charger plug 110. In some embodiments, the switch 108 may also be commanded to route power from the signal LVD to the signal LVB to recharge the auxiliary system backup battery 112. Once the high-voltage battery 104, and optionally the auxiliary system backup battery 112, are sufficiently recharged and/or the user chooses to end the recharging, the electronic control unit 114 may return (NORMAL CMD) to the state 144 by issuing a set of commands to the switch 108 and the converter 106.

The state 150 may implement an auxiliary charge state. From the state 146, the electronic control unit 114 may transition (CHARGE CMD) to the state 150. In the state 150, the electronic control unit 114 may command the switch 108 to connect the signal LVE to the signal LVC. The electronic control unit 114 may also command the converter 106 into the up-conversion mode. In the up-conversion mode, the converter 106 may charge the high-voltage battery 104 using the power in the signal LVC received through the auxiliary connector 124. In some embodiments, the switch 108 may also be commanded to route power from the signal LVE to the signal LVB to recharge the auxiliary system backup battery 112. Once the high-voltage battery 104, and optionally the auxiliary system backup battery 112, are sufficiently recharged and/or the user chooses to end the recharging, the electronic control unit 114 may return (NOR-MAL CMD) to the state 146 by issuing a set of commands to the switch 108 and the converter 106.

If the battery charger plug 110 receives power while in the state 150, the electronic control unit 114 may transition (PLUGGED) back to the state 148 and command the switch 108 to route power from the signal LVD to the signal LVB. If the battery charger plug 110 loses power while in the state 148, the electronic control unit 114 may transition (UNPLUGGED) to the state 150 and command the switch to route power from the signal LVE to the signal LVB. While five states are illustrated in the example implementation, other numbers of state and transition triggers may be implemented to meet the design criteria of a particular application.

The functions performed by the diagrams of FIGS. 1-3 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    a first converter configured to generate a high-voltage signal by up-converting a first low-voltage signal received from a first power rail;
    a high-voltage battery configured to store said high-voltage signal;
    a second converter configured to generate a second low-voltage signal by down-converting said high-voltage signal;
    a switch configured to route said second low-voltage signal to a second power rail while said apparatus is in a first mode; and
    a charger plug connected to said switch and configured to receive a third low-voltage signal from an external source, wherein (i) said first power rail is electrically separated from said second power rail and (ii) said switch is configured to route said third low-voltage signal to said second power rail while said apparatus is in a second mode.

2. The apparatus according to claim 1, wherein said first low-voltage signal is generated from power derived from an internal combustion engine.

3. The apparatus according to claim 1, wherein said switch is further configured to disconnect said second low-voltage signal from said second power rail while said apparatus is in said second mode.

4. The apparatus according to claim 1, further comprising an interface connected to said switch and configured to receive a fourth low-voltage signal from an exterior power source, wherein said switch is further configured to route said fourth low-voltage signal to said second power rail while said apparatus is in a third mode.

5. The apparatus according to claim 4, wherein said switch is further configured to disconnect said third low-voltage signal from said second power rail while said apparatus is in said third mode.

6. The apparatus according to claim 1, further comprising a low-voltage battery connected to said second power rail, wherein (i) said switch is a break-before-make switch and (ii) said low-voltage battery maintains power on said second power rail while said switch breaks all connections while changing between modes.

7. The apparatus according to claim 1, wherein said switch is further configured to route said third low-voltage signal from said charger plug to said second converter while said apparatus is in said second mode.

8. The apparatus according to claim 7, wherein said second converter is further configured to recharge said high-voltage battery by up-converting said third low-voltage signal.

9. The apparatus according to claim 1, further comprising an electronic control unit configured to control a mode of said apparatus in response to a plurality of commands received from a user interface device.

10. The apparatus according to claim 9, wherein said electronic control unit is further configured to control said second converter between an up-conversion mode and a down-conversion mode.

11. The apparatus according to claim 9, wherein said electronic control unit is further configured to report a status of said switch to said user interface device.

12. The apparatus according to claim 1, wherein (i) said first power rail has a first voltage in a first range from approximately 10 volts to approximately 50 volts, (ii) said high-voltage battery has a second voltage in a second range from approximately 200 volts to approximately 600 volts, and (iii) said second power rail drives one or more loads up to 15,000 watts.

13. An apparatus comprising:
    a first converter configured to generate a high-voltage signal by up-converting a first low-voltage signal received from a first power rail;
    a high-voltage battery configured to store said high-voltage signal;
    a second converter configured to generate a second low-voltage signal by down-converting said high-voltage signal; and
    an electronic control unit configured to control a mode of said apparatus in response to a plurality of commands received from a user interface device, wherein (i) said first power rail is electrically separated from a second power rail and (ii) said electronic control unit is further configured to control said second converter between an up-conversion mode and a down-conversion mode.

14. The apparatus according to claim 13, wherein said first low-voltage signal is generated from power derived from an internal combustion engine.

15. The apparatus according to claim 13, further comprising a switch configured to route said second low-voltage signal to said second power rail while said apparatus is in a first mode.

16. The apparatus according to claim 15, wherein said switch is further configured to disconnect said second low-voltage signal from said second power rail while said apparatus is in a second mode.

17. The apparatus according to claim 15, further comprising an interface connected to said switch and configured to receive a fourth low-voltage signal from an exterior power source, wherein said switch is further configured to route said fourth low-voltage signal to said second power rail while said apparatus is in a third mode.

18. The apparatus according to claim 17, wherein said switch is further configured to disconnect a third low-voltage signal from said second power rail while said apparatus is in said third mode.

19. The apparatus according to claim 15, wherein said electronic control unit is further configured to report a status of said switch to said user interface device.

20. An apparatus comprising:
    a first converter configured to generate a high-voltage signal by up-converting a first low-voltage signal received from a first power rail;
    a high-voltage battery configured to store said high-voltage signal;
    a second converter configured to generate a second low-voltage signal by down-converting said high-voltage signal;
    a switch configured to route a third low-voltage signal to a second power rail; and
    a charger plug configured to receive said third low-voltage signal from a source external to a vehicle, wherein said first power rail is electrically separated from said second power rail.

\* \* \* \* \*